(12) United States Patent
Park et al.

(10) Patent No.: US 12,559,162 B2
(45) Date of Patent: Feb. 24, 2026

(54) STEERING APPARATUS

(71) Applicant: HL MANDO CORPORATION, Pyeongtaek-si (KR)

(72) Inventors: Sang Hyun Park, Gyeonggi-do (KR); Jong Han Kim, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 712 days.

(21) Appl. No.: 17/973,414

(22) Filed: Oct. 25, 2022

(65) Prior Publication Data

US 2023/0150569 A1 May 18, 2023

(30) Foreign Application Priority Data

Nov. 16, 2021 (KR) ........................ 10-2021-0157315

(51) Int. Cl.
*B62D 5/04* (2006.01)

(52) U.S. Cl.
CPC ......... *B62D 5/0421* (2013.01); *B62D 5/0454* (2013.01)

(58) Field of Classification Search
CPC ............................ B62D 5/0421; B62D 5/0454
USPC .................................................. 180/444, 446
See application file for complete search history.

(56) References Cited

U.S. PATENT DOCUMENTS

2019/0210633 A1* 7/2019 Derocher ............... B62D 1/181

FOREIGN PATENT DOCUMENTS

| | | | | |
|---|---|---|---|---|
| CN | 101258066 A | * | 9/2008 | ......... F16H 25/2204 |
| DE | 11 2019 004 741 | | 6/2021 | |
| JP | 2018047809 A | * | 3/2018 | ............. B62D 1/192 |
| JP | 2018192929 A | * | 12/2018 | |
| JP | 6883240 | | 6/2021 | |
| KR | 20200034340 A | * | 3/2020 | ............. B62D 1/185 |
| KR | 10-2111357 | | 5/2020 | |

OTHER PUBLICATIONS

Office Action dated Apr. 10, 2024 for German Patent Application No. 10 2022 211 816.2 and its English translation provided by Applicant's foreign counsel.

Office Action dated Aug. 16, 2023 for Korean Patent Application No. 10-2021-0157315and its English translation provided by Applicant's Foreign Counsel.

* cited by examiner

*Primary Examiner* — Jacob D Knutson

(74) *Attorney, Agent, or Firm* — WOMBLE BOND DICKINSON (US) LLP

(57) ABSTRACT

One embodiment of the present invention relates to a steering apparatus, in which not only a middle tube but also an inner tube can be moved along a longitudinal direction of an outer tube, and thus, stroke control of the steering apparatus can be effectively performed. Specifically, in the steering apparatus, the speed reducer is supported by a first transport guide and a second transport guide, moves along the first transport guide according to power of a motor, and can effectively rotate the second transport guide.

20 Claims, 9 Drawing Sheets

STEERING APPARATUS

CROSS REFERENCE TO RELATED APPLICATION

The present application claims priority to Korean Patent Application No. 10-2021-0157315, filed Nov. 16, 2021, the entire contents of which is incorporated herein for all purposes by this reference.

TECHNICAL FIELD

One embodiment of the present disclosure relates to a steering apparatus, and in more detail, a steering apparatus which supports a steering wheel of a vehicle to effectively adjust a length of the steering wheel in a narrow space.

BACKGROUND

In general, a steering apparatus is installed in a vehicle and supports the steering wheel to transmit steering of a wheel according to a rotation of the steering wheel. Specifically, the steering apparatus effectively transmits a steering angle of the steering wheel to the steering of the wheel.

The steering apparatus can also adjust a distance between a driver and the steering wheel according to a preferred environment of the driver.

In the conventional steering apparatus, a change in stroke according to the length adjustment of the steering wheel is limited by an installation space of the steering apparatus.

In addition, in the conventional steering apparatus, a screw bar for guiding a movement of a tube of the steering apparatus protrudes to the rear when a vehicle crash occurs, and thus, there is a problem in that an injury occurs due to collision between the screw bar and the driver.

That is, there is a need for a steering apparatus capable of having a large change in stroke in a limited space of the vehicle.

In addition, there is a need for a steering apparatus capable of reducing the problem of injury caused by a collision between a driver and the steering apparatus even when a vehicle crash occurs.

SUMMARY

One embodiment of the present disclosure provides a steering apparatus capable of improving responsiveness of stroke control and greatly adjusting variability of the stroke in a compact installation space.

According to an aspect of the present disclosure, there is provided a steering apparatus including: an outer tube elongated in one direction; a middle tube of which at least a portion is inserted into the outer tube; an inner tube partially inserted into the middle tube; a steering shaft partially inserted into the inner tube and partially movable in a longitudinal direction of the outer tube together with the inner tube; a motor configured to provide power so that the middle tube and the inner tube move in the longitudinal direction of the outer tube; a first transport guide disposed along the longitudinal direction of the outer tube and supported by the outer tube; a second transport guide separated from the first transport guide and disposed along the longitudinal direction of the outer tube; and a speed reducer supported by the first transport guide and the second transport guide and configured to decelerate power supplied by the motor and transmit decelerated power.

The speed reducer may include a worm rotated by the motor, a first gear engaged with the worm and supported by the first transport guide, and a second gear engaged with the first gear and supported by the second transport guide.

The first transport guide and the second transport guide may be formed with spirals in different directions.

The speed reducer may further include a deceleration guide which is disposed between the first transport guide and the first gear and movable along the spiral of the first transport guide.

The speed reducer may further include a housing in which the first gear and the second gear are accommodated.

The steering apparatus may further include a first outer guide hole of which one region is formed in the outer tube to be open along the longitudinal direction of the outer tube.

The speed reducer may include a support portion of which one region passes through the first outer guide hole and is coupled to the middle tube.

The steering apparatus may further include a second outer guide hole disposed to be spaced apart from the first outer guide hole and having one region formed to be open along the longitudinal direction of the outer tube, and a middle guide hole formed to be open in the middle tube so that the second outer guide hole and at least one region face each other.

The steering apparatus may further include a guide block portion having one side moving along the second transport guide and the other side being disposed to pass through the second outer guide hole and the mid guide hole and supported by the inner tube.

The guide block portion may include a guide block moving along the second transport guide, and a slider supporting the inner tube so that the inner tube moves together with the guide block.

According to another aspect of the present disclosure, there is provided a steering apparatus including: an outer tube elongated in one direction; a middle tube of which at least a portion is inserted into the outer tube; an inner tube partially inserted into the middle tube; a steering shaft partially inserted into the inner tube and partially movable along a longitudinal direction of the outer tube together with the inner tube; a motor configured to provide power so that the middle tube and the inner tube move along the longitudinal direction of the outer tube; a speed reducer configured to decelerate power supplied by the motor and transmit decelerated power; a first transport guide disposed to engage with one side of the speed reducer to guide a movement of the speed reducer; and a second transport guide disposed to be spaced apart from the first transport guide to engage with the other side of the speed reducer and together moving when the speed reducer moves to guide a movement of the inner tube.

The steering apparatus may further include a first outer guide hole of which one region is formed in the outer tube to be open along the longitudinal direction of the outer tube, and a support portion having one side connected to the speed reducer and the other side passing through the first outer guide hole to be coupled to the middle tube and moving the middle tube together when the speed reducer.

The steering apparatus may further include a second outer guide hole disposed to be spaced apart from the first outer guide hole and having one region formed to be open along the longitudinal direction of the outer tube, a middle guide hole formed to be open in the middle tube so that the second outer guide hole and at least one region face each other, an inner guide hole formed to be open in the inner tube such that the middle guide hole and at least one region face each other, and a guide block portion having one side moving along the second transport guide and the other side coupled to passing through the second outer guide hole, the middle guide hole, and the inner guide hole to move the inner tube.

The first transport guide and the second transport guide may be arranged to extend in different directions about the speed reducer.

According to one embodiment of the present disclosure, the steering apparatus can increase the transport distance of the inner tube to the same length and also increase its speed, so that it can effectively control the variability of the stroke and has a great effect on the degree of freedom of the installation space.

DETAILED DESCRIPTION

Figure 1:
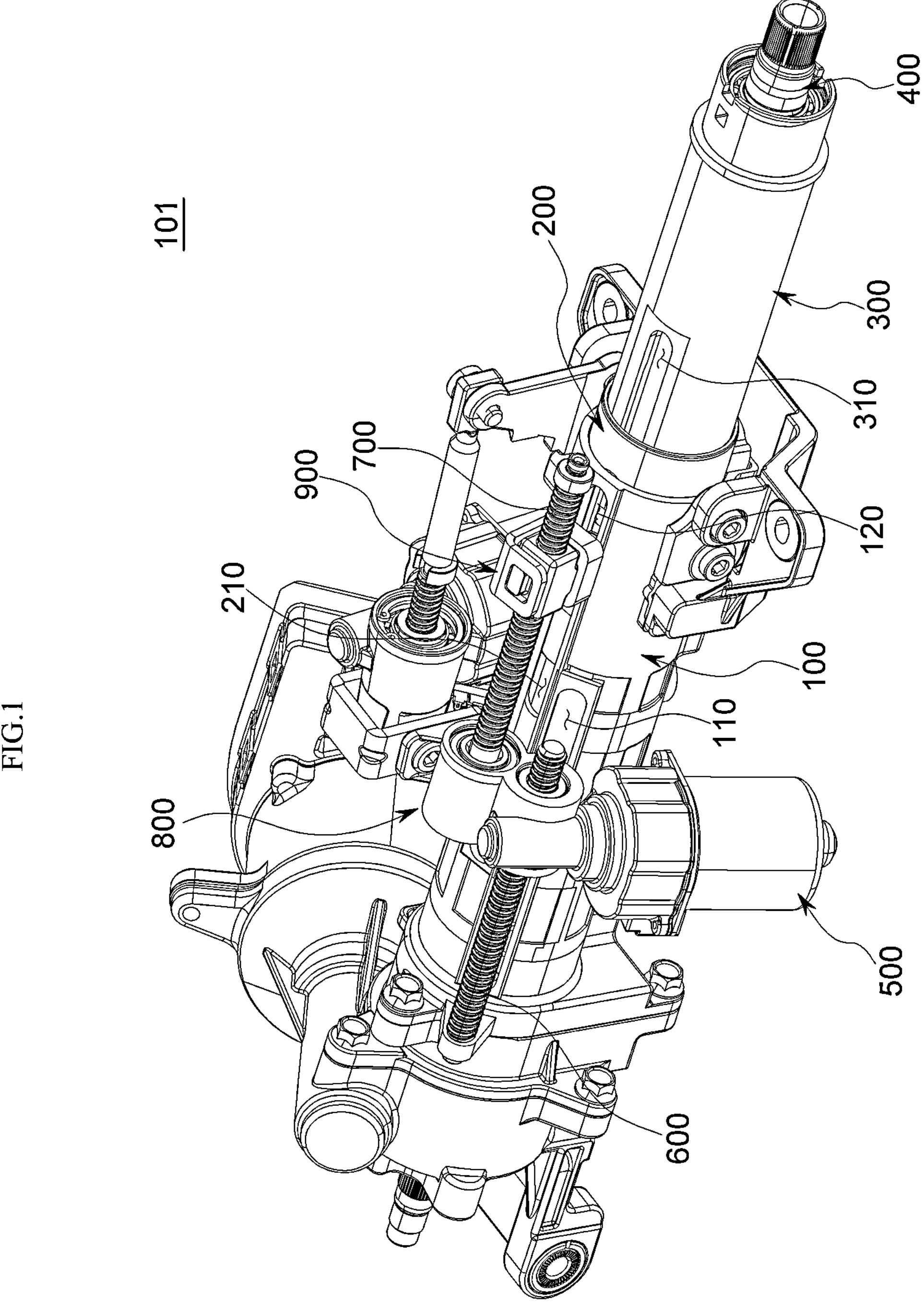
FIG. 1 illustrates a perspective view of a steering apparatus according to one embodiment of the present disclosure.

Hereinafter, with reference to the accompanying drawings, one embodiment of the present disclosure will be described in detail so that a person having ordinary knowledge in the technical field to which the present disclosure belongs can easily implement it. The present disclosure may be implemented in several different forms and is not limited to the embodiments described herein.

It is noted that the drawings are schematic and not drawn to scale. Relative dimensions and proportions of parts in the drawings are illustrated exaggerated or reduced in size for clarity and convenience in the drawings, and any dimensions are illustrative only and not limiting. Moreover, the same reference numerals are used to indicate like features to the same structural element or part appearing in two or more drawings.

An embodiment of the present disclosure specifically represents an ideal embodiment of the present disclosure. As a result, various modifications of the diagram are expected. Accordingly, the embodiment is not limited to a specific shape of the illustrated area, and includes, for example, a shape modification by manufacturing.

Hereinafter, as illustrated in FIGS. 1 to 9, an outer tube 100, a middle tube 200, an inner tube 300, a steering shaft 400, a motor 500, a first transport guide 600, a second transport guide 700, and a speed reducer 800 will be described.

The outer tube 100 is elongated in one direction. In addition, the outer tube 100 is formed in a hollow inside and may form the outer shape of a steering apparatus 101.

At least a portion of the middle tube 200 may be inserted into the outer tube 100. Specifically, the middle tube 200 may be arranged side by side along a longitudinal direction of the outer tube 100, and at least a portion of the middle tube 200 may be inserted into the hollow outer tube 100. Moreover, the middle tube 200 may be drawn in and out along the longitudinal direction of the outer tube 100.

The middle tube 200 may be slidably supported into the outer tube 100.

The steering shaft 400 is partially inserted in the inner tube 300 and a portion of the steering shaft 400 may be moved together with the inner tube 300. A portion of the steering shaft 400 is inserted into the inner tube 300 and may be moved along the longitudinal direction of the outer tube 100 together when the inner tube 300 moves.

A steering wheel is installed at an end of the steering shaft 400, and thus, a driver can perform steering by manipulating the steering wheel.

The motor 500 provides power so that the middle tube 200 and the inner tube 300 move along the longitudinal direction of the outer tube 100. The motor 500 may provide power for movements of the middle tube 200 and the inner tube 300 so that the stroke of the steering apparatus 101 is changed.

The first transport guide 600 is disposed along the longitudinal direction of the outer tube 100, and is supported by the outer tube 100. Specifically, the first transport guide 600 may be disposed outside the outer tube 100 in a direction parallel to the longitudinal direction of the outer tube 100. In addition, one end of the first transport guide 600 may be supported on the outer tube 100.

One end of the first transport guide 600 may be supported in the form of a cantilever by an outer support region protruding from the outer tube 100 in a circumferential direction.

The outer support region of the outer tube 100 may be disposed in a direction opposite to an end portion of the steering shaft 400 in which the steering wheel is installed.

Moreover, the first transport guide 600 may guide the transport of the middle tube 200 and the inner tube 300.

The second transport guide 700 is spaced apart from the second transport guide 700 and disposed along the longitudinal direction of the outer tube 100. Specifically, the second transport guide 700 may be disposed on the outside of the outer tube 100 to be spaced apart from the first transport guide 600.

In addition, the second transport guide 700 may guide the transport of the inner tube 300.

For example, a center of the second transport guide 700 and a center of the first transport guide 600 may be disposed parallel to each other.

The speed reducer 800 is supported by the first transport guide 600 and the second transport guide 700. Moreover, the speed reducer 800 decelerates and transmits the power provided by the motor 500. Specifically, the speed reducer 800 may receive the power from the motor 500, move along the first transport guide 600, and rotate the second transport guide 700.

The first transport guide 600 and the second transport guide 700 may be arranged to extend in different directions about the speed reducer 800.

By such a configuration, in the steering apparatus 101 according to one embodiment of the present disclosure, the inner tube 300 as well as the middle tube 200 can move along the longitudinal direction of the outer tube 100, and thus, it is possible to effectively adjust the stroke of the steering apparatus 101.

Specifically, the speed reducer 800 is supported by the first transport guide 600 and the second transport guide 700, and is moved along the first transport guide 600 according to the power of the motor 500, and the second transport guide 700 can be effectively rotated.

Figure 2:
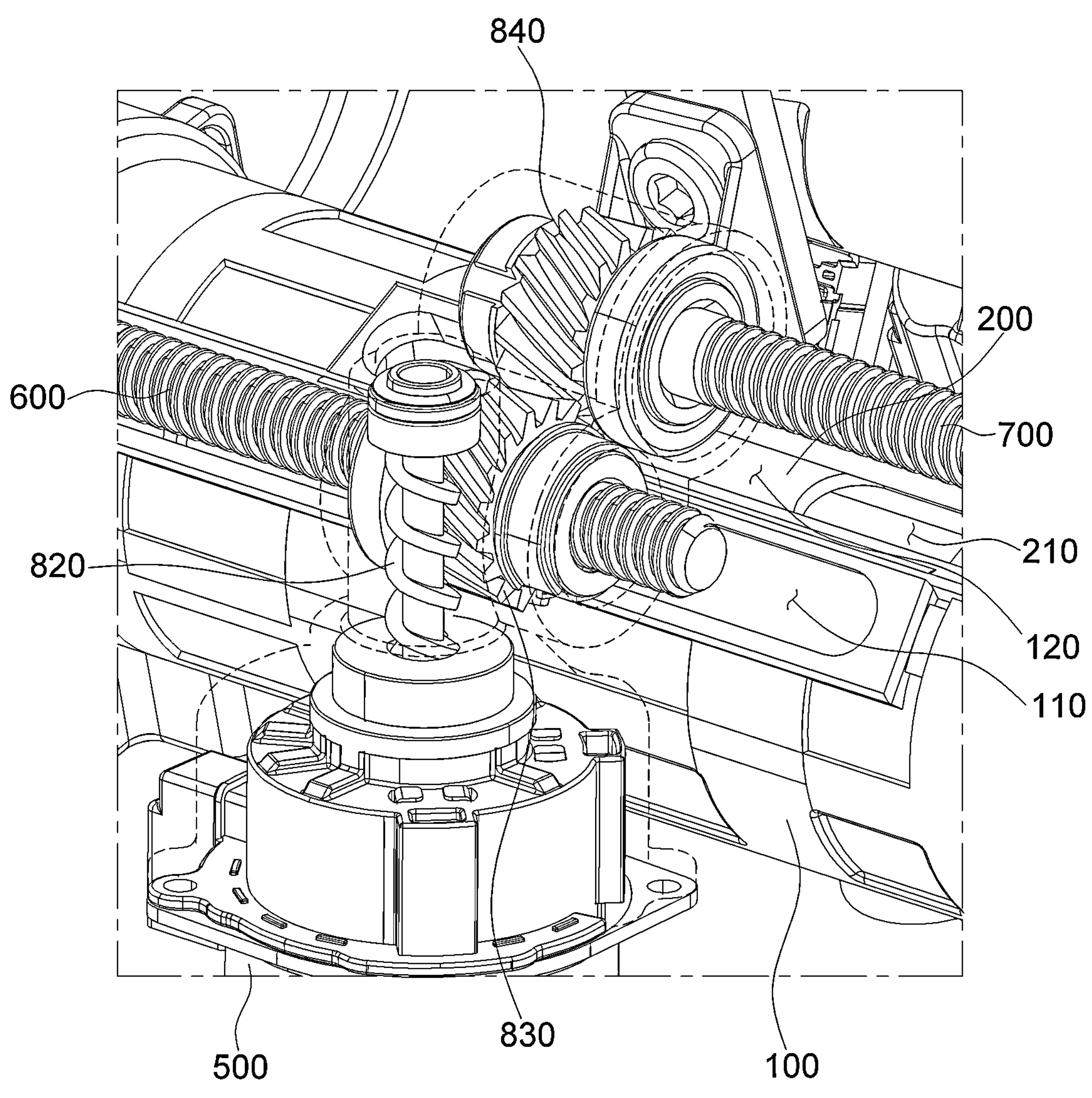
FIG. 2 illustrates an enlarged view when a housing of the speed reducer portion of FIG. 1 is projected.

In addition, the speed reducer 800 of the steering apparatus 101 according to one embodiment of the present disclosure may include a worm 820, a first gear 830, and a second gear 840 as illustrated in FIG. 2.

The worm 820 may be rotated by the motor 500. Specifically, the worm 820 may be formed on an output shaft of the motor 500 and rotate together according to a rotational force of the motor 500. Moreover, the output shaft of the motor 500 may be disposed in a direction perpendicular to the first transport guide 600.

The first gear 830 may be supported by the first transport guide 600. In addition, a portion of an outer periphery of the first gear 830 may engage with the worm 820 so that the first gear rotates according to the rotation of the worm 820. That is, a rotation direction of the first gear 830 may be rotated about a central axis of the first transport guide 600.

The second gear 840 may be disposed so that an outer periphery thereof engages with the first gear 830. In addition, the second gear 840 may be supported by the second transport guide 700. That is, the second gear 840 may be rotated by the first gear 830.

Moreover, when the second gear 840 is rotated by the first gear 830, the second transport guide 700 may be rotated.

Therefore, the speed reducer 800 includes the worm 820, the first gear 830, and the second gear 840, and thus, the power of the motor 500 may be transferred to the second gear 840 spaced apart from the first transport guide 600 to rotate the second transport guide 700.

Figure 4:
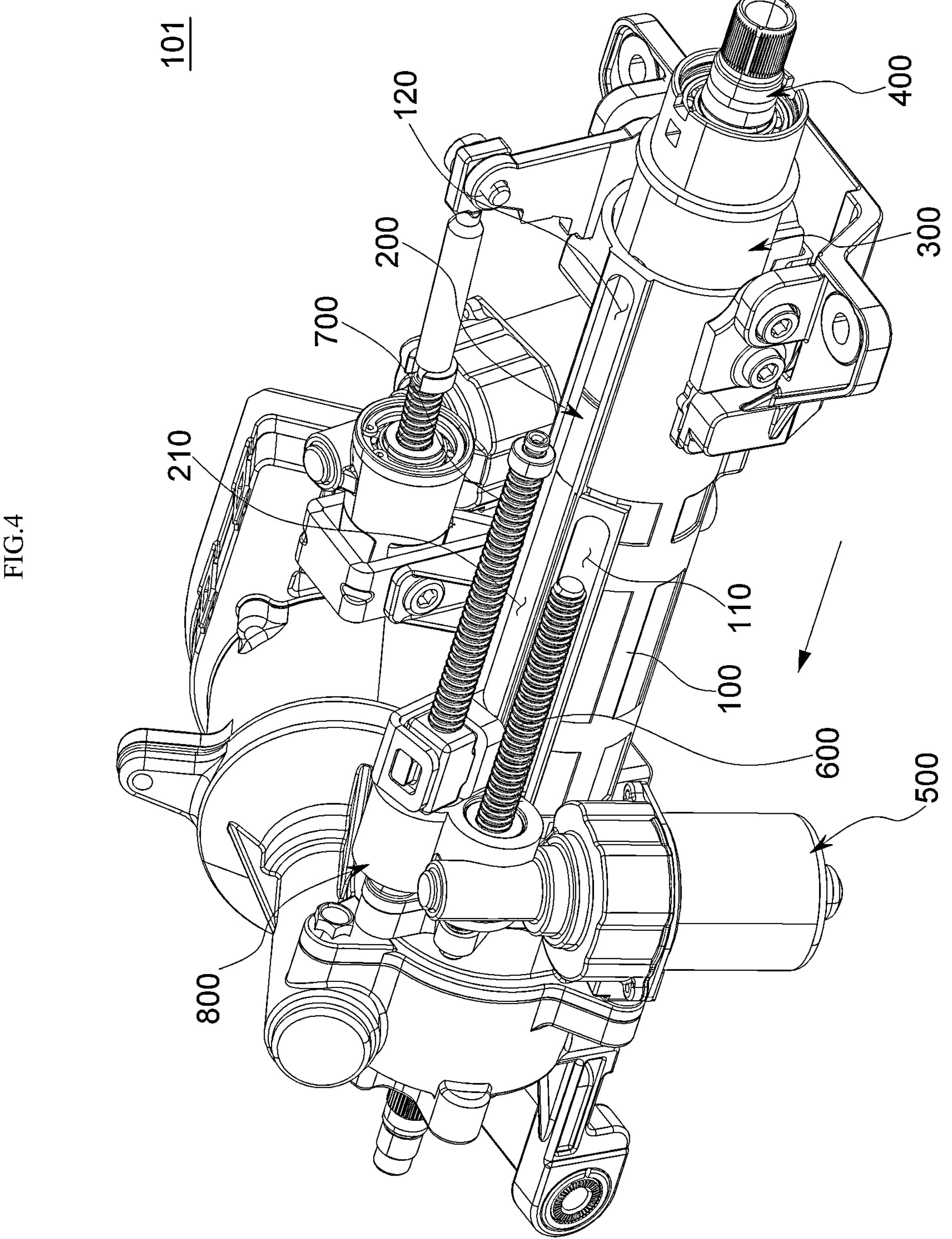
FIG. 4 illustrates a state in Which a stroke of the steering apparatus according to one embodiment of the present disclosure is reduced.
Figure 5:
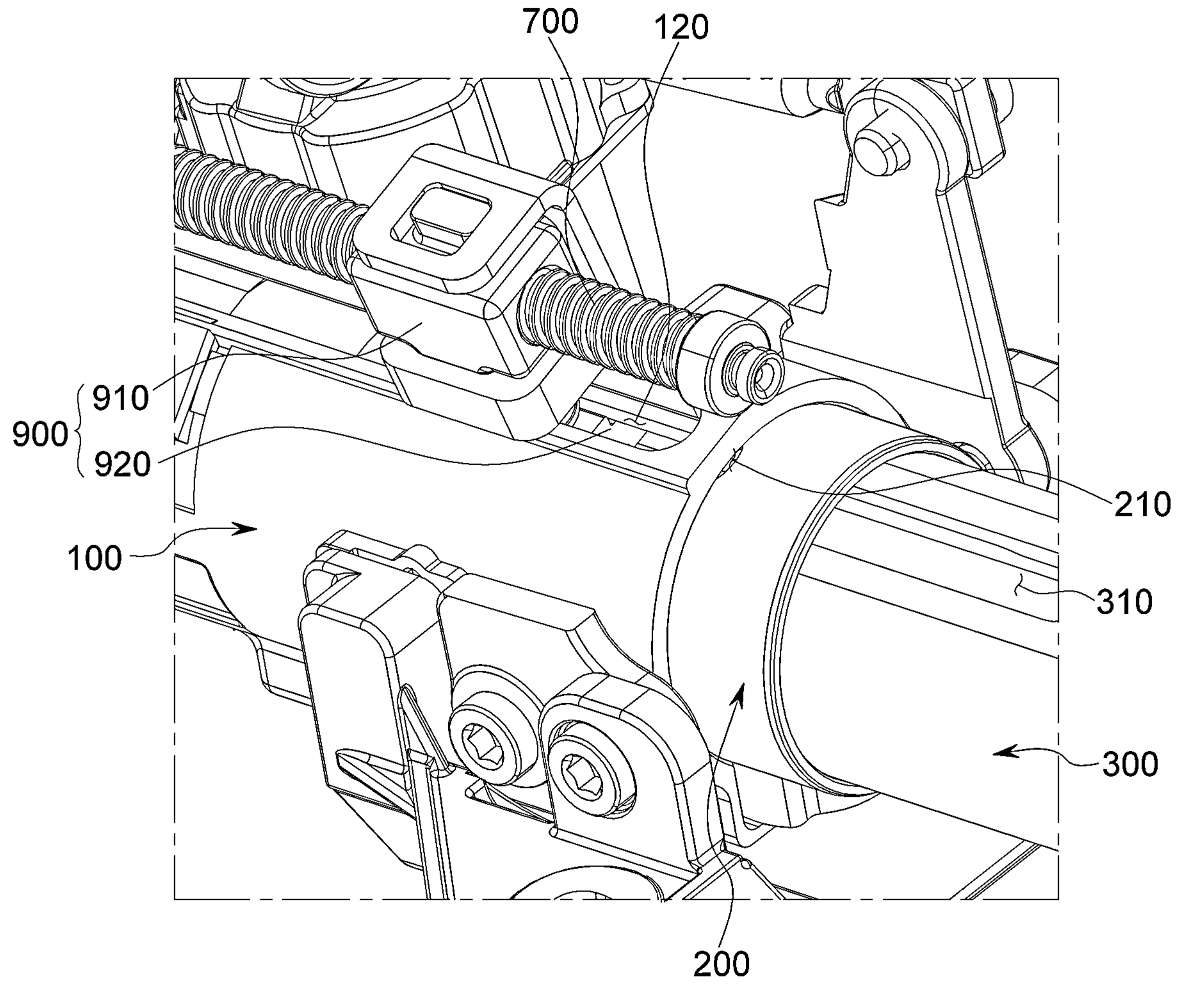
FIG. 5 is an enlarged view of a guide block portion of FIG. 1.

In addition, in the first transport guide 600 and the second transport guide 700 according to one embodiment of the present disclosure, as illustrated in FIGS. 1 and 4, spirals in different directions may be formed.

For example, the first transport guide 600 may have a right-handed spiral. In addition, the second transport guide 700 may have a left-handed spiral.

Specifically, one end of the first transport guide 600 may be disposed to be adjacent to one end of the outer tube 100. One end of the second transport guide 700 may support the second gear 840, and the other end of the second transport guide 700 may be disposed adjacent to the other end of the outer tube 100.

In this case, the other end of the outer tube 100 may be in a direction relatively adjacent to a position at which the steering wheel of the steering shaft 400 is supported.

In addition, a length of each of the first transport guide 600 and the second transport guide 700 may be formed to be relatively shorter than a length of the outer tube 100 as illustrated in FIG. 4.

Figure 7:
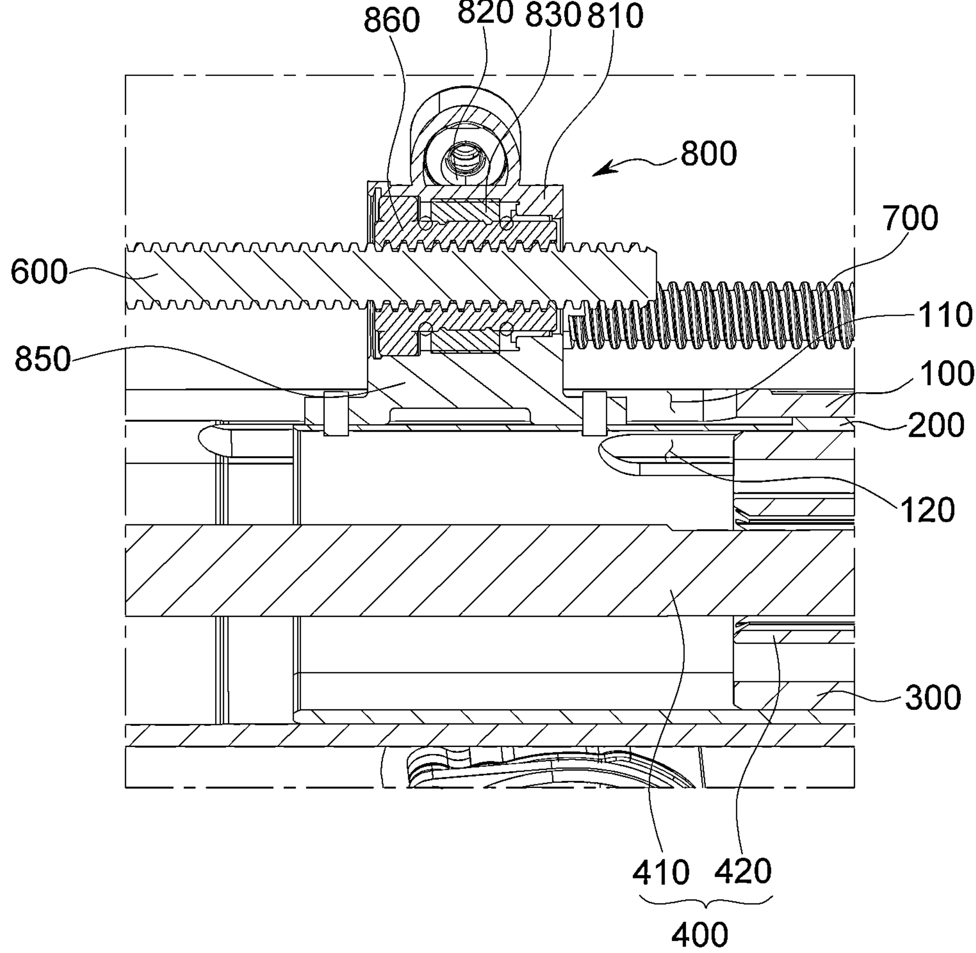
FIG. 7 illustrates a part of a cross-sectional view along a longitudinal direction of a first transport guide.

In addition, the speed reducer 800 of the steering apparatus 101 according to one embodiment of the present disclosure, as illustrated in FIG. 7, may further include a deceleration guide 860.

The deceleration guide 860 may be disposed between an outer peripheral surface of the first transport guide 600 and a center of the first gear 830. In addition, a groove is formed on an inner peripheral surface of the deceleration guide 860 in a direction in which the deceleration guide 860 engages with the spiral formed on the first transport guide 600, and thus, the deceleration guide 860 may move along the longitudinal direction of the first transport guide 600. The outer periphery of the deceleration guide 860 may engage with the first gear 830, and thus, rotate together according to the rotation of the first gear 830.

That is, according to the rotation of the first gear 830 rotated by the worm 820, the deceleration guide 860 moves the spiral of the outer periphery of the first transport guide 600 along the longitudinal direction of the first transport guide 600.

At this time, as illustrated in FIGS. 2 and 4, the motor 500 for rotating the worm 820 may also be moved along the longitudinal direction of the first transport guide 600. In addition, the second gear 840 is also rotated by the first gear 830, and the second gear 840 and the second transport guide 700 may also be moved along the longitudinal direction of the first transport guide 600.

Accordingly, the speed reducer 800 may receive rotational power from the motor 500 and move along the longitudinal direction of the first transport guide 600. In addition, when the speed reducer 800 moves along the longitudinal direction of the first transport guide 600, the second transport guide 700 may also move along the longitudinal direction of the first transport guide 600.

Figure 8:
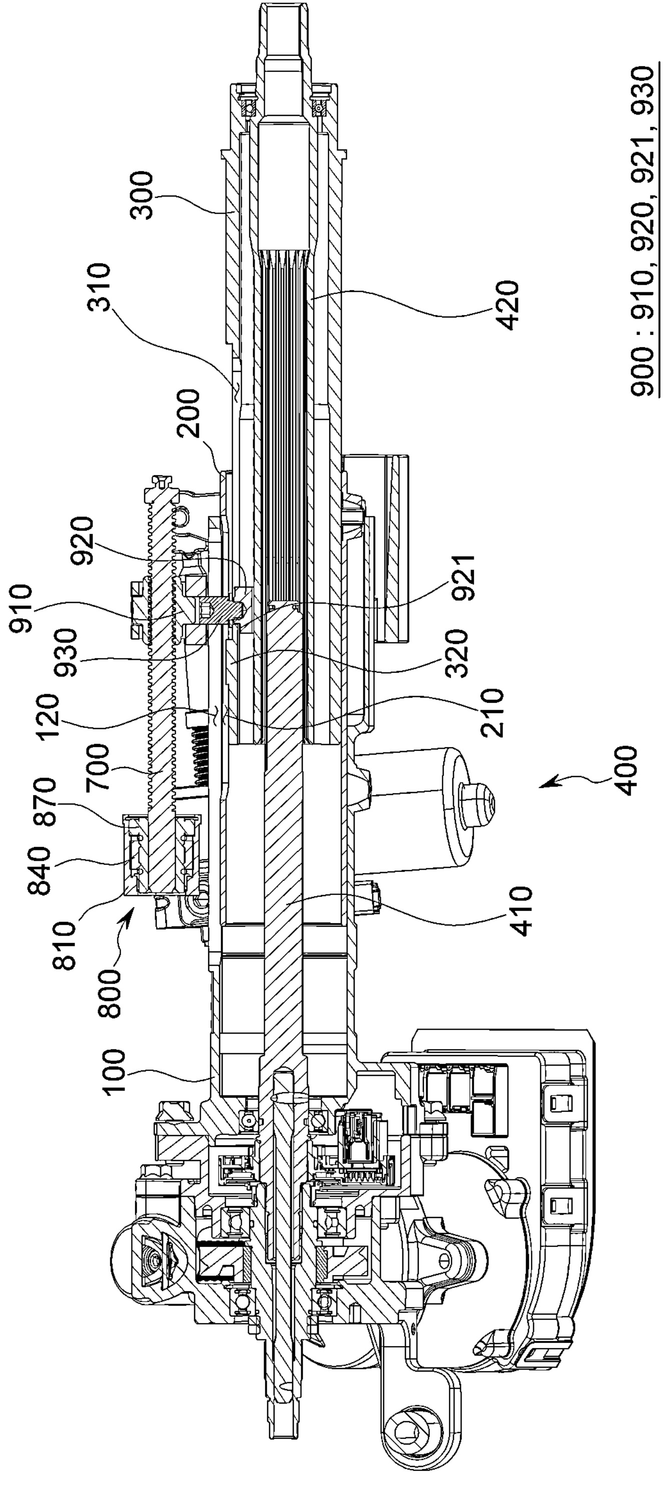
FIGS. 8 and 9 illustrate a stroke adjustment process of the steering apparatus according to one embodiment of the present disclosure.

Specifically, as illustrated in FIG. 8, the speed reducer 800 of the steering apparatus 101 according to one embodiment of the present disclosure may further include a rotation guide 870 which is disposed between the second gear 840 and the second transport guide 700.

The rotation guide 870 may rotate the second transport guide 700 when the second gear 840 is rotated. Specifically, a spiral is not formed at one end of the second transport guide 700 coupled to the rotation guide 870, and thus, the rotation guide 870 rotates together with the second gear 840 when the second gear 840 rotates to rotate the second transport guide 700.

Figure 3:
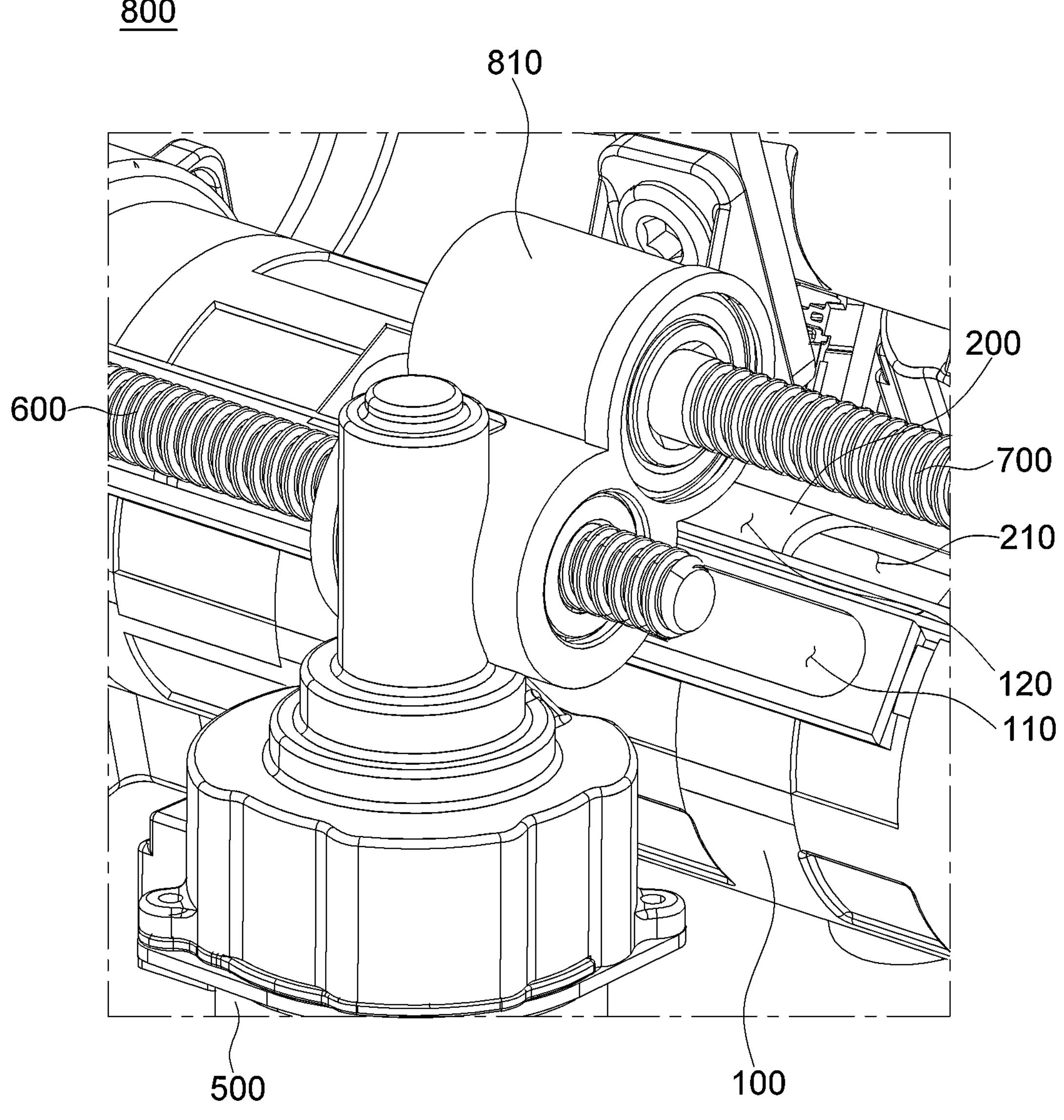
FIG. 3 illustrates an enlarged view of the speed reducer portion of FIG. 1.

In addition, the speed reducer 800 according to one embodiment of the present disclosure may further include a housing 810, as illustrated in FIG. 3.

The housing 810 may accommodate the first gear 830 and the second gear 840. In addition, the housing 810 forms the outer shape of the speed reducer 800, and may secure a space in which the first gear 830 and the second gear 840 engage with each other and maintain a distance therebetween. Alternatively, the housing 810 may also accommodate at least a portion of the worm 820 formed on the output shaft of the motor 500.

In addition, according to one embodiment of the present disclosure, the steering apparatus 101 may further include a first outer guide hole 110.

The first outer guide hole 110 may be opened in one region of the outer tube 100 along the longitudinal direction of the outer tube 100. Specifically, the first outer guide hole 110 may be formed to face the first transport guide 600.

Figure 6:
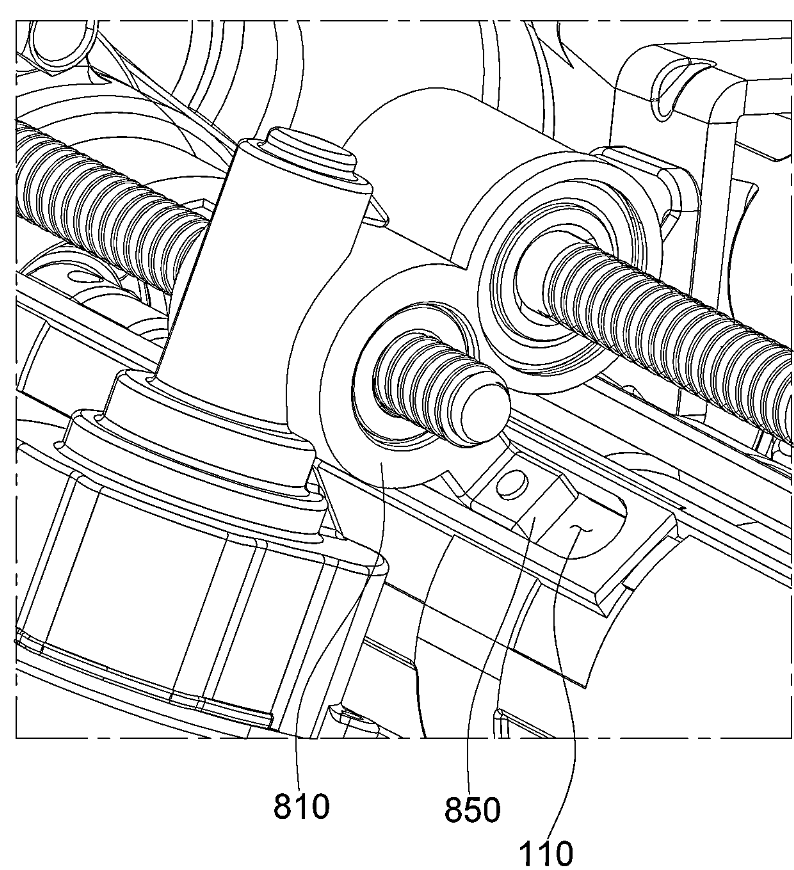
FIG. 6 is an enlarged view illustrating an area between an inner tube and the speed reducer of FIG. 1.

In addition, according to one embodiment of the present disclosure, the speed reducer 800 of the steering apparatus 101 may further include a support portion 850, as illustrated in FIG. 6.

One region of the support portion 850 may be coupled to the middle tube 200 through the first outer guide hole 110. Specifically, the support portion 850 may connect the housing 810 and the middle tube 200.

The support portion 850 may allow the middle tube 200 and the speed reducer 800 to move together.

For example, a portion of the housing 810 is formed to extend through the first outer guide hole 110 and may be coupled to the middle tube 200. Alternatively, a separate support portion 850 is connected between the housing 810 and the middle tube 200 so that the middle tube 200 is also moved when the speed reducer 800 is moved along the first transport guide 600.

In addition, the steering apparatus 101 according to one embodiment of the present disclosure may include a second outer guide hole 120 and a middle guide hole 210 as illustrated in FIGS. 1 to 9.

The second outer guide hole 120 may be spaced apart from the first outer guide hole 110. In addition, one region on the outer tube 100 may be formed to be open along the longitudinal direction of the outer tube 100. Specifically, the second outer guide hole 120 may be formed to face the second transport guide 700.

In addition, one region of the second outer guide hole 120 may be disposed relatively adjacent to the other end of the outer tube 100 and one region of the first outer guide hole 110.

The middle guide hole 210 may be formed to be open on the middle tube 200. Moreover, the middle guide hole 210 may be formed such that at least one region faces the second outer guide hole 120.

In addition, the steering apparatus 101 according to one embodiment of the present disclosure may further include a guide block portion 900 as illustrated in FIGS. 5 and 7 to 9.

The guide block portion 900 is arranged such that one side moves along the second transport guide 700, and the other side passes through the second outer guide hole 120 and the middle guide hole 210 to support the inner tube 300. Specifically, one side of the guide block portion 900 may move along the spiral of the second transport guide 700, and the other side may be supported by the inner tube 300 to move together with the inner tube 300.

That is, when the guide block portion 900 moves along the second transport guide 700, the inner tube 300 may be moved together.

In addition, the steering apparatus 101 according to one embodiment of the present disclosure may further include an inner guide hole 310.

The inner guide hole 310 may be formed to be open to the inner tube 300 so that one region faces the middle guide hole 210.

Moreover, the other side of the guide block portion 900 may be supported by one region of the steering shaft 400 through the inner guide hole 310.

Specifically, the steering shaft 400 includes a first shaft 410 in which one region is disposed in the outer tube 100, and a second shaft 420 which is inserted into one region of the first shaft 410 and disposed inside the inner tube 300 and supports the steering wheel.

The second shaft 420 may be movable along a longitudinal direction of the first shaft 410 and may be rotatably supported in the inner tube 300. When the second shaft 420 rotates, the first shaft 410 may also rotate.

Figure 9:
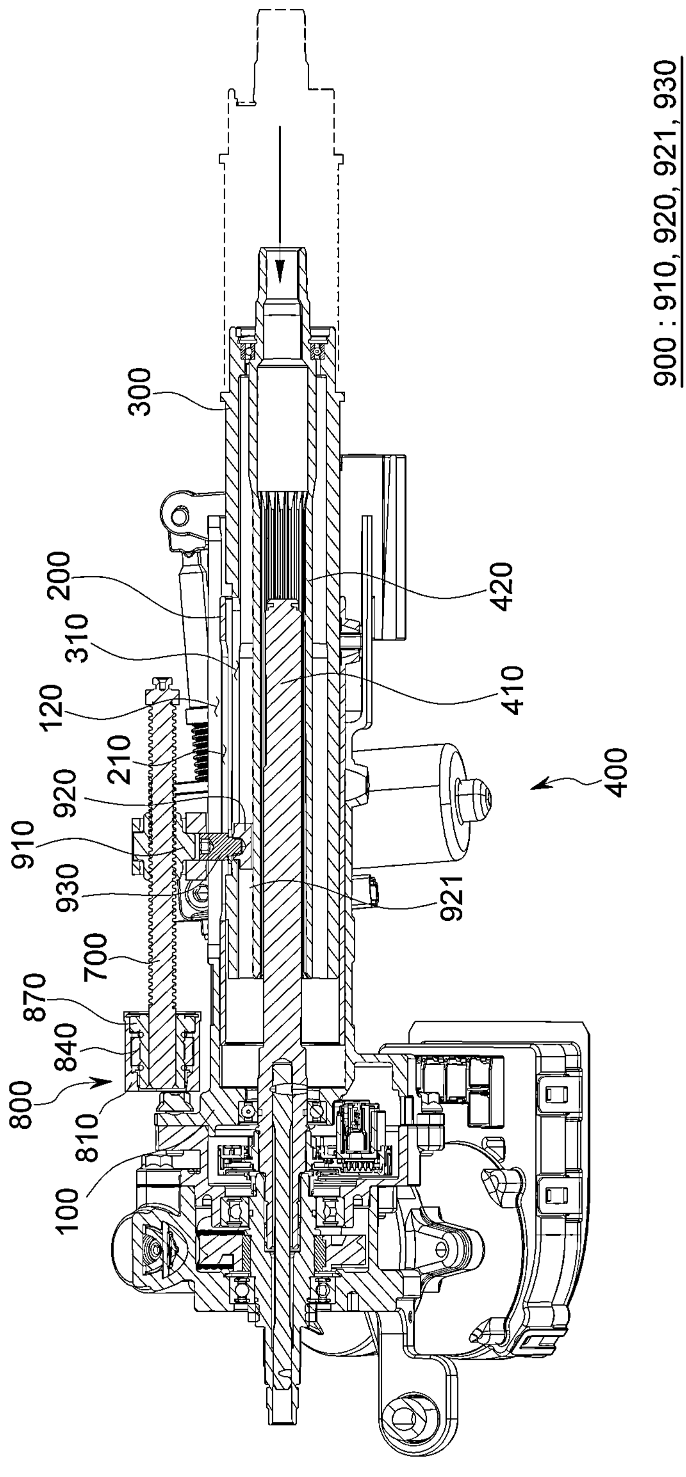

In addition, the guide block portion 900 according to one embodiment of the present disclosure may include a guide block 910 and a slider 920 as illustrated in FIGS. 8 and 9. The guide block 910 may move along the second transport guide 700. Specifically, a groove engaged with the spiral of the second transport guide 700 is formed on an inner periphery of the guide block 910, and when the second transport guide 700 is rotated by the second gear 840, the guide block 910 may move along the second transport guide 700.

The slider 920 supports the inner tube 300 to move together with the guide block 910. Specifically, the slider 920 is supported by the inner tube 300 so that the slide 902 moves together with the inner tube 300 when the guide block 910 moves along the second transport guide 700.

In addition, the slider 920 is formed with a locking groove 921 to be lock-coupled to one end of an inner diameter of the inner guide hole 310, and the region facing the outer periphery of the second shaft 420 is the second shaft 420 may be formed to contact and support one region of the second shaft 420.

Accordingly, the slider 920 may support the inner tube 300 and the second shaft 420 so that not only the inner tube 300 but also the second shaft 420 are drawn into and out from the outer tube 100 along the longitudinal direction of the outer tube 100.

In addition, one region of one side of the inner tube 300 facing the middle guide hole 210 according to one embodiment of the present disclosure may include an inner protrusion 320 protruding toward the middle guide hole 210.

The inner protrusion 320 may prevent the inner peripheral surface of the middle guide hole 210 from colliding with the guide block portion 900.

In addition, the guide block portion 900 according to one embodiment of the present disclosure may further include a connection member 930.

The connection member 930 is disposed between the slider 920 and the guide block 910 to connect the slider 920 and the guide block 910.

In addition, one end of the first transport guide 600 of the steering apparatus 101 according to one embodiment of the present disclosure is cantilevered to the inner tube 300, the other end of the second transport guide 700 is disposed relatively adjacent to one end of the outer tube 100 than the other end of the inner tube 300, and thus, it is possible to prevent the driver from being injured by the first transport guide 600 and the second transport guide 700 when a vehicle impact occurs.

By such a configuration, the inner tube 300 and the steering shaft 400 of the steering apparatus 101 according to one embodiment of the present disclosure move when the speed reducer 800 moves along the first transport guide 600, and also move according to the movement of the guide block portion 900 which is moved when the second transport guide 700 is rotated.

That is, according to a specific arrangement structure of the speed reducer 800 and the first transport guide 600 and the second transport guide 700, the inner tube can have the steering apparatus 101 having a great stroke.

In other words, the inner tube 300 may be moved along the first transport guide 600 according to the power provided by the motor 500, and also moved by the guide block portion 900 moving along the second transport guide 700 according to the rotation of the second transport guide 700.

In the inner tube 300 of the steering apparatus 101 according to one embodiment of the present disclosure, the movement stroke may be increased, and the speed thereof may also be increased.

Hereinafter, an operation process of the steering apparatus 101 according to one embodiment of the present disclosure will be described with reference to FIGS. 8 to 9.

The driver operates an operation button (not illustrated) or the like in a direction of shortening the stroke according to the need for adjusting the stroke length of the steering apparatus 101. Accordingly, the motor 500 is operated.

The worm 820 rotates in one direction according to the power provided by the motor 500. When the worm 820 is rotated, the first gear 830 engaged therewith is rotated. At this time, the deceleration guide 860 rotates along the spiral of the first transport guide 600. Accordingly, the speed reducer 800 is moved in a direction in which the speed reducer 800 closer to one end of the outer tube 100 along the longitudinal direction of the first transport guide 600.

In addition, the middle tube 200 connected to the support portion 850 of the speed reducer 800 is also moved in a direction closer to one end of the outer tube 100. At this time, the inner tube 300 connected to the second transport guide 700 and the guide block portion 900 is also moved in the direction closer to one end of the outer tube 100.

When the first gear 830 is rotated, the second gear 840 meshed therewith is also rotated, and the second transport guide 700 is moved together with the speed reducer 800 along the longitudinal direction of the first transport guide 600 and rotated by the second gear 840.

The guide block 910 is transported in a direction adjacent to the speed reducer 800 along the spiral of the second transport guide 700, and moves the inner tube 300 in the direction closer to one end of the outer tube 100.

When the user operates the operation button (not illustrated) or releases the operation button, the current stroke of the steering apparatus 101 can be maintained.

Alternatively, when the user operates the operation button (not illustrated) in a different direction or in a different mode, the steering apparatus 101 may be operated in a direction in which the stroke is extended.

Accordingly, the inner tube 300 moving together with the second shaft 420 on which the steering wheel may be moved by not only the second transport guide 700 moving along the longitudinal direction of the first transport guide 600, but also the movement of the guide block portion 900 according to the rotation of the second transport guide 700.

Accordingly, the inner tube 300 may be transported a double distance so that the inner tube 300 can be moved not only in the longitudinal direction of the first transport guide 600 but also in the longitudinal direction of the second transport guide 700 through the same straight distance.

The steering apparatus 101 according to one embodiment of the present disclosure may vary the inner tube 300 and the steering shaft 400 have a large stroke in a narrow space, and may improve a variable speed. Therefore, the driver can be transferred to have a quick response to the stroke control of the steering apparatus 101 can reduce the fatigue for the control.

In addition, the steering apparatus 101 according to one embodiment of the present disclosure can perform effective stroke variation even in a compact space.

Although the embodiment of the present disclosure has been described with reference to the accompanying drawings, those skilled in the art to which the present disclosure belongs will be able to understand that the present disclosure may be implemented in other specific forms without changing its technical idea or essential characteristics.

Therefore, the embodiments described above are to be understood as illustrative and not restrictive in all respects, the scope of the present disclosure is indicated by the following claims, and all changes or modifications derived from the meaning and scope of the claims and their equivalents should be construed as being included in the scope of the present disclosure.

DETAILED DESCRIPTION OF MAIN ELEMENTS

| | | | |
|---|---|---|---|
| 100: | outer tube | 101: | steering apparatus |
| 110: | first outer guide hole | 120: | second outer guide hole |
| 200: | middle tube | 210: | middle guide hole |
| 300: | inner tube | 310: | inner guide hole |
| 400: | steering shaft | 500: | motor |
| 600: | first transport guide | 700: | second transport guide |
| 800: | speed reducer | 810: | housing |
| 820: | worm | 830: | first gear |
| 840: | second gear | 850: | support portion |
| 860: | deceleration guide | 900: | guide block portion |
| 910: | guide block | 920: | slider |

What is claimed is:

1. A steering apparatus comprising:

an outer tube elongated in one direction;

a middle tube of which at least a portion is inserted into the outer tube;

an inner tube partially inserted into the middle tube;

a steering shaft partially inserted into the inner tube and partially movable along a longitudinal direction of the outer tube together with the inner tube;

a motor configured to provide power so that the middle tube and the inner tube move along the longitudinal direction of the outer tube;

a first transport guide disposed outside the outer tube along the longitudinal direction of the outer tube and supported by the outer tube;

a second transport guide separated from the first transport guide and disposed outside the outer tube along the longitudinal direction of the outer tube; and a speed reducer supported by the first transport guide and the second transport guide and configured to decelerate power supplied by the motor and transmit decelerated power.

2. The steering apparatus of claim 1, wherein the speed reducer includes a worm rotated by the motor, a first gear engaged with the worm and supported by the first transport guide, and a second gear engaged with the first gear and supported by the second transport guide.

3. The steering apparatus of claim 2, wherein the first transport guide and the second transport guide are formed with spirals in different directions.

4. The steering apparatus of claim 3, wherein the speed reducer further includes a deceleration guide which is disposed between the first transport guide and the first gear and movable along the spiral of the first transport guide.

5. The steering apparatus of claim 2, wherein the speed reducer further includes a housing in which the first gear and the second gear are accommodated.

6. The steering apparatus of claim 1, further comprising a first outer guide hole is formed in the outer tube to be open along the longitudinal direction of the outer tube.

7. The steering apparatus of claim 6, wherein the speed reducer includes a support portion passing through the first outer guide hole and is-coupled to the middle tube.

8. The steering apparatus of claim 6, further comprising:

a second outer guide hole disposed to be spaced apart from the first outer guide hole and having one region formed to be open along the longitudinal direction of the outer tube; and a middle guide hole which is formed to be open in the middle tube so that at least a part of the second outer guide hole and at least a part of the middle guide hole face each other.

9. The steering apparatus of claim 8, further comprising a guide block portion having one side moving along the second transport guide and the other side being disposed to pass through the second outer guide hole and the mid guide hole and supported by the inner tube.

10. The steering apparatus of claim 9, wherein the guide block portion includes a guide block moving along the second transport guide, and a slider supporting the inner tube so that the inner tube moves together with the guide block.

11. A steering apparatus comprising:

an outer tube elongated in one direction;

a middle tube of which at least a portion is inserted into the outer tube;

an inner tube partially inserted into the middle tube;

a steering shaft partially inserted into the inner tube and partially movable along a longitudinal direction of the outer tube together with the inner tube;

a motor configured to provide power so that the middle tube and the inner tube move along the longitudinal direction of the outer tube;

a speed reducer configured to decelerate power supplied by the motor and transmit decelerated power;

a first transport guide disposed outside the outer tube and engaged with the speed reducer to guide a movement of the speed reducer; and a second transport guide disposed outside the outer tube, spaced apart from the first transport guide, engaged with the speed reducer, and configured to be movable together with the first transport guide when the speed reducer moves to guide a movement of the inner tube.

12. The steering apparatus of claim 11, further comprising:

a first outer guide hole of which one region is formed in the outer tube to be open along the longitudinal direction of the outer tube; and a support portion having one side connected to the speed reducer and the other side passing through the first outer guide hole to be coupled to the middle tube and moving the middle tube together when the speed reducer moves.

13. The steering apparatus of claim 12, further comprising:

a second outer guide hole disposed to be spaced apart from the first outer guide hole and having one region formed to be open along the longitudinal direction of the outer tube;

a middle guide hole which is formed to be open in the middle tube so that at least a part of the second outer guide hole and at least a part of the middle guide hole face each other;

an inner guide hole which is formed to be open in the inner tube such that at least a part of the middle guide hole and at least a part of the inner guide hole face each other; and a guide block portion having one side moving along the second transport guide and the other side coupled to passing through the second outer guide hole, the middle guide hole, and the inner guide hole to move the inner tube.

14. The steering apparatus of claim 11, wherein the first transport guide and the second transport guide are arranged to extend in different directions about the speed reducer.

15. A steering apparatus comprising:

an outer tube;

a middle tube at least partially inserted in the outer tube;

an inner tube at least partially inserted in the middle tube;

a steering shaft at least partially inserted in the inner tube and configured to be movable along an axial direction of the outer tube together with the inner tube;

a motor configured to move the middle tube and the inner tube along the axial direction of the outer tube;

a first transport guide configured to guide movement of the middle tube and the inner tube, and disposed outside the outer tube and supported by the outer tube; and a second transport guide configured to guide movement of the inner tube, and disposed outside the outer tube and parallel with the first transport guide.

16. The steering apparatus of claim 15, further comprising a speed reducer configured to decelerate torque transmitted from the motor, the speed reducer including:

a worm configured to be rotatable by the decelerated torque, a first gear rotatably engaged with the worm and coupled to the first transport guide, and a second gear engaged with the first gear and coupled to the second transport guide.

17. The steering apparatus of claim 16, wherein spirals of the first transport guide and spirals of the second transport guide are formed in different directions from each other.

18. The steering apparatus of claim 16, wherein the speed reducer further includes a housing, wherein the first gear and the second gear are accommodated in a single piece of the housing.

19. The steering apparatus of claim 15, further comprising a first outer guide hole which is formed at the outer tube and open along the axial direction of the outer tube.

20. The steering apparatus of claim 19, further comprising:

a second outer guide hole which is formed at the outer tube and open along the axial direction of the outer tube; and a middle guide hole which is formed to be open in the middle tube so that at least a part of the second outer guide hole and at least a part of the middle guide hole face each other.

* * * * *